(12) United States Patent
Beikler

(10) Patent No.: US 10,618,048 B2
(45) Date of Patent: Apr. 14, 2020

(54) SAMPLE CONTAINER FOR RECEIVING SMALL-VOLUME LIQUID SAMPLES

(71) Applicant: PVA TePla AG, Wettenberg (DE)

(72) Inventor: Robert Beikler, München (DE)

(73) Assignee: PVA TePla AG, Wettenberg (DE)

( * ) Notice: Subject to any disclaimer, the term of this patent is extended or adjusted under 35 U.S.C. 154(b) by 165 days.

(21) Appl. No.: 15/830,275

(22) Filed: Dec. 4, 2017

(65) Prior Publication Data

US 2018/0154352 A1     Jun. 7, 2018

(30) Foreign Application Priority Data

Dec. 5, 2016   (DE) .......................... 10 2016 014 457

(51) Int. Cl.
  *B01L 3/00*   (2006.01)
  *G01N 1/38*   (2006.01)
  *G01N 1/40*   (2006.01)

(52) U.S. Cl.
CPC ............... *B01L 3/508* (2013.01); *B01L 3/502* (2013.01); *G01N 1/38* (2013.01); *G01N 1/40* (2013.01); *G01N 1/4022* (2013.01); *B01L 3/567* (2013.01); *B01L 2300/04* (2013.01); *B01L 2300/049* (2013.01); *B01L 2300/06* (2013.01)

(58) Field of Classification Search
CPC ... B01L 2300/0832; B01L 3/508; B65D 1/00; B65D 1/06
See application file for complete search history.

(56) References Cited

U.S. PATENT DOCUMENTS

| | | | | |
|---|---|---|---|---|
| 3,166,496 | A | * | 1/1965 | Kelsall ...................... B03B 9/00 209/209 |
| 2006/0207682 | A1 | | 9/2006 | Engel |
| 2009/0249863 | A1 | * | 10/2009 | Kim ................. H01L 21/67126 73/31.07 |
| 2018/0149670 | A1 | * | 5/2018 | Bork ....................... G01F 13/00 |

FOREIGN PATENT DOCUMENTS

| | | | |
|---|---|---|---|
| DE | 859 684 C | 12/1952 | |
| DE | 1734524 U | 11/1956 | |
| DE | 2411262 A1 | 9/1975 | |
| DE | 101 25 126 A1 | 11/2002 | |
| DE | 20210894 U1 | 11/2002 | |
| DE | 11 2008 002979 T5 | 11/2010 | |
| DE | 102012009118 A1 * | 11/2013 | ............ B01F 13/055 |
| EP | 3 088 904 A1 | 11/2016 | |
| JP | 07260643 A1 * | 10/1995 | |
| WO | WO 2013110474 A9 * | 12/2013 | |

* cited by examiner

*Primary Examiner* — David A Rogers
(74) *Attorney, Agent, or Firm* — Dilworth & Barrese, LLP

(57) ABSTRACT

The present invention relates to a sample container for receiving small-volume liquid samples, preferably samples obtained by vapor phase decomposition, wherein the container has an upwardly open receiving region. In accordance with the invention, the receiving region has an outflow opening at its lowest point that is reversibly closed in a liquid-tight manner by an actuator having a closure surface.

11 Claims, 5 Drawing Sheets

SAMPLE CONTAINER FOR RECEIVING SMALL-VOLUME LIQUID SAMPLES

Figure 1:
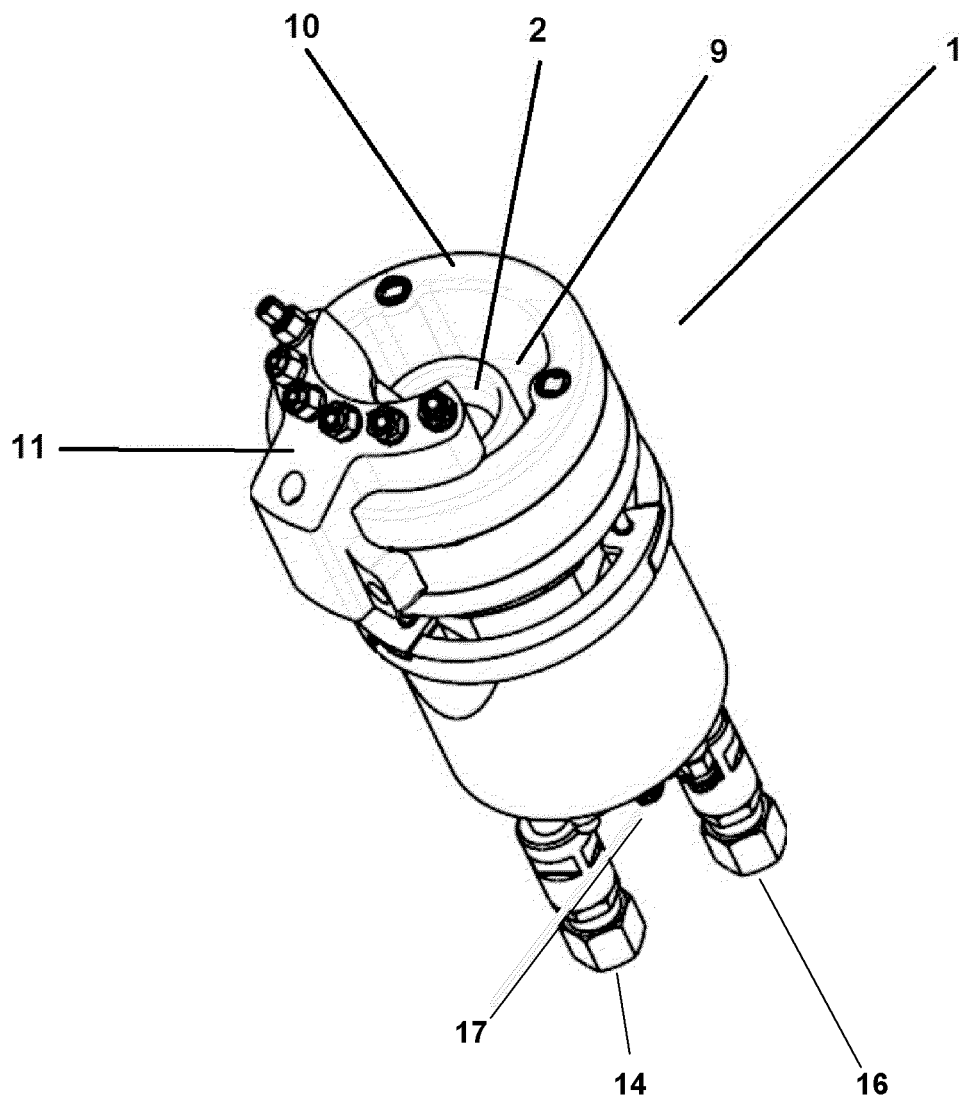

The invention relates to a sample container for receiving small-volume liquid samples and to methods of using said sample container.

Sample containers for receiving small-volume liquid samples are used in various technical and scientific fields. For example in sample preparation methods of analytical chemistry, obtained liquid samples are stored in sample containers prior to the actual analysis, for example for further conditioning (dilution) that serves the preparation for the measurement.

In this context in the prior art, so-called vials in racks (i.e. holders for batches) are typically used that are removed from the application site after use and are replaced with a new rack (or with the cleaned rack). Such interventions are labor-intensive and comprise high risks of contamination.

It is the object of the invention to provide a sample container that can remain stationary at the application site and does not have to be removed or changed after use. A further object of the invention comprises proposing suitable methods for using such a sample container.

Against this background, the invention relates to a sample container for receiving small-volume liquid samples, preferably samples obtained through vapor phase decomposition, wherein the container has an upwardly open receiving region, with the receiving region having an outlet opening at its lowest point that is reversibly closed in a liquid-tight manner by an actuator with a closure surface.

In an embodiment, the receiving region is conical and the lowest point of the receiving region is formed by the cone apex. In accordance with the understanding of the present invention, receiving regions having curved directrices are also to be considered as conical. It is, however, preferably a circular cone having straight directrices. Straight or skewed cones are generally conceivable. The opening angle of the cone can amount, for example, to between 60° and 100°, preferably to between 70° and 90°.

In an embodiment, the outlet opening starts at the cone apex and extends, starting from there, only in a direction into the surface of a cone. This produces an asymmetrical design of the outlet opening with respect to the cone, with the cone apex not being at the center or within the outlet opening, but with the edge of outlet opening directly extending through the cone apex.

The outlet opening can, for example, be round or oval.

In an embodiment, the closure surface of the actuator follows the contour of the receiving region. The jacket surface of the receiving region thus has no irregularity with a closed outlet opening.

In an embodiment, the actuator is a plunger that can preferably be moved in parallel with the axis of the cone to draw the closure surface reversibly downwardly from the extent of the surface of the cone and thus to reversibly release the drain opening. The plunger can, for example, be pneumatically operated.

A drain space can be present at the other side of the drain opening. The drain opening or, if present, the drain space, is preferably connected to an extractor and preferably to a pump that can generate a vacuum at the drain opening or, if present, in the drain space. Liquid can thus be withdrawn downwardly with an open outlet opening.

In an embodiment, the receiving region is surrounded by an overflow region at its open upper side. A filling station and/or withdrawal station can be arranged at the upper side of the sample container and can lead pipette tips to the receiving region.

The receiving region can be produced from a fluoroplastic or can be coated with a fluoroplastic. Suitable fluoroplastics, for example, comprise a PTFE/PPVE copolymer. The same applies to the actuator or at least to its closure surface and to the overflow region and drain region or drain space. Fluoroplastics typically have a pronounced chemical resistance and hydrophobic and oleophobic properties. Provision can, however, also be made, for example, that the actuator and optionally also its closure surface can be produced from PEEK. Different materials such as stainless steel, ceramics, etc., can also be used in specific application areas.

Against the initially named background, the invention further relates to a method for using a sample container in accordance with the invention, wherein the receiving region is filled with a substitution liquid during an idling phase after the removal of a sample and before a filling with a new sample.

Provision is made in an embodiment that the receiving region of the sample container is covered during the idling phase.

Provision is made in an embodiment that additional substitution liquid is topped up in the receiving region after the elapse of a predefined time period and/or after falling below a predefined liquid level during the idling phase.

The outflow opening can remain closed during the idling phase.

The substitution liquid can, for example, correspond to the optionally diluted carrier liquid of the samples. If the carrier liquid is, for example, an acid, as can be the case in the vapor phase decomposition, provision can be made that the acid concentration in the flushing liquid is lower than in the carrier liquid. In an application example, the substitution liquid is diluted hydrofluoric acid.

Against the initially named background, the invention furthermore relates to a method for using a sample container in accordance with the invention, wherein, after removal of a sample, at least one flushing cycle, and preferably a plurality of flushing cycles, is/are run through in which the receiving region is flushed with flushing liquid, with the receiving region being at least partly filled with flushing liquid in each flushing cycle with a closed outflow opening and with the outflow opening being opened to let out the flushing liquid. A flushing in a reverse direction is, however, also possible via the drain space into the overflow region with an open outflow opening.

Provision can optionally be made that the flushing liquid is actively sucked out with an open outflow opening.

A plurality of flushing cycles can be advantageous since a cleaning effect can be achieved by the repeated sweeping over of the wall with the phase boundary.

If a plurality of flushing cycles are provided, a different amount of filling of the receiving region can be provided for different flushing cycles. In a final flushing cycle, for example the receiving region can be filled up to the overflow. This makes it possible to remove drops adhering to the walls of the receiving region.

The flushing liquid can for example, be water or another solvent that can form the base of the carrier liquid.

In an embodiment, the receiving region is at least partly filled with a cleaning fluid after removal of the sample and before running through the flushing cycles with a closed outflow opening, with the outflow opening being opened after the elapse of a cleaning interval to let out the cleaning fluid.

This step serves to dissolve any sample residues present in the receiving region.

The cleaning fluid can, for example, correspond to the carrier liquid of the samples. In an application example, the cleaning fluid can be concentrated hydrofluoric acid.

Against the initially named background, the invention also relates to a method for using a sample container in accordance with the invention, wherein the outflow opening is opened before filling the receiving region with a sample up to the complete outflow of flushing liquid or substitution liquid and wherein a vacuum is applied to the outflow opening during the opening and/or a flushing gas is introduced into the receiving region.

A residue-free outflow of flushing liquid or substitution liquid is thus made possible.

Provision can be made in an embodiment that, with an empty receiving region, the outflow opening is closed and opened again at least once after the outflow of the flushing liquid or substitution liquid, with a vacuum also being applied to the outflow opening and/or a flushing gas being introduced into the receiving region during the repeated opening.

Any liquid residues present in the gap region between the closure surface and the jacket surface can thus be removed without residue.

Two or more of the methods in accordance with the invention can be used in combination with one another to form a common method for handling small-volume liquid samples.

In an embodiment, the methods in accordance with the invention form a part of a method for sample analysis, wherein the liquid samples are subsequently added to an analysis apparatus such as a mass spectrometer or a gas chromatography column. The method for sample analysis, for example, comprises a vapor phase decomposition, preferably for concentrating contaminants on substrates such as silicon substrates.

Different sample preparation methods can, however, also be carried out with the invention in different sectors in which the buffering of the liquids for preparation and/or processing/manipulation is included.

Figure 2:
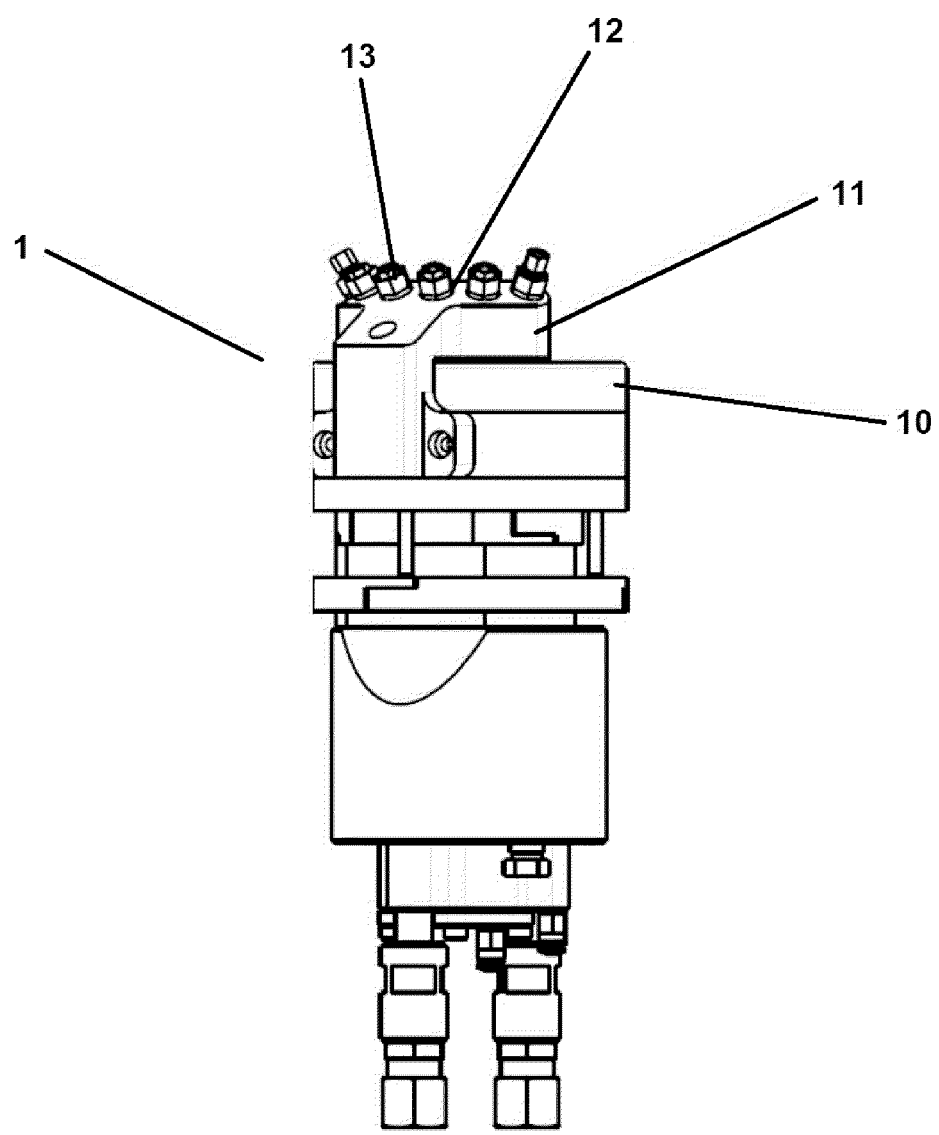
Figure 3:
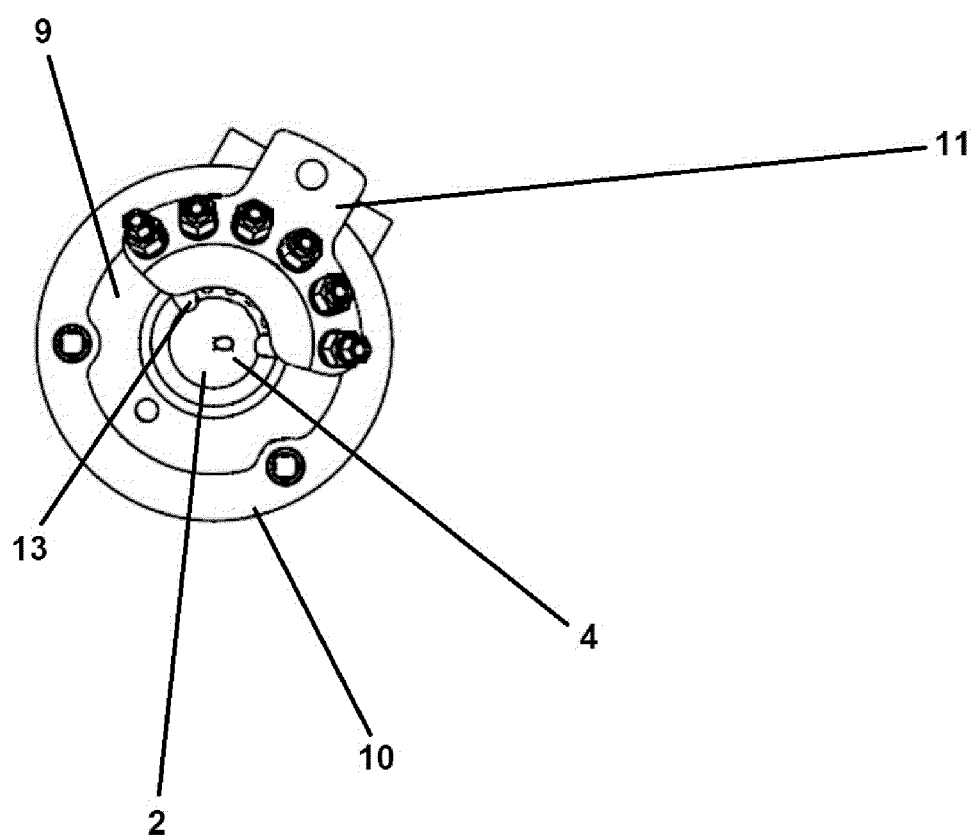
Figure 4:
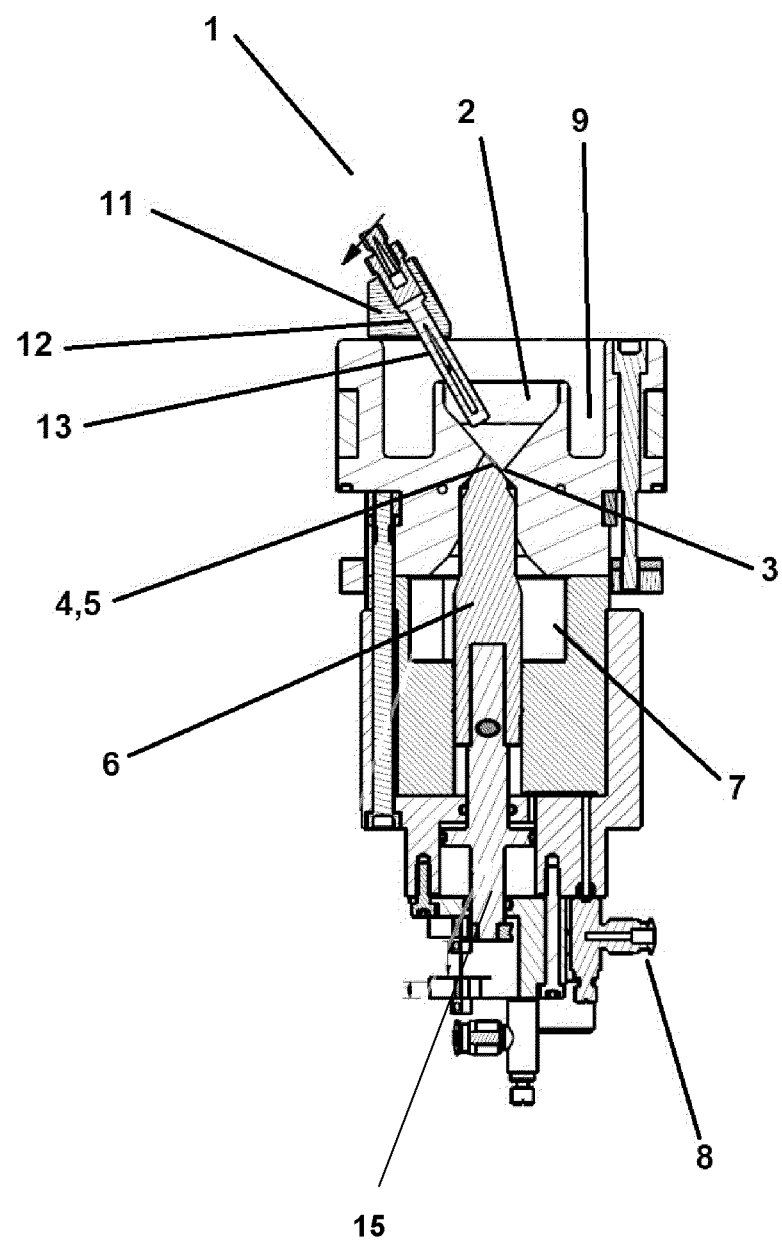
Figure 5:
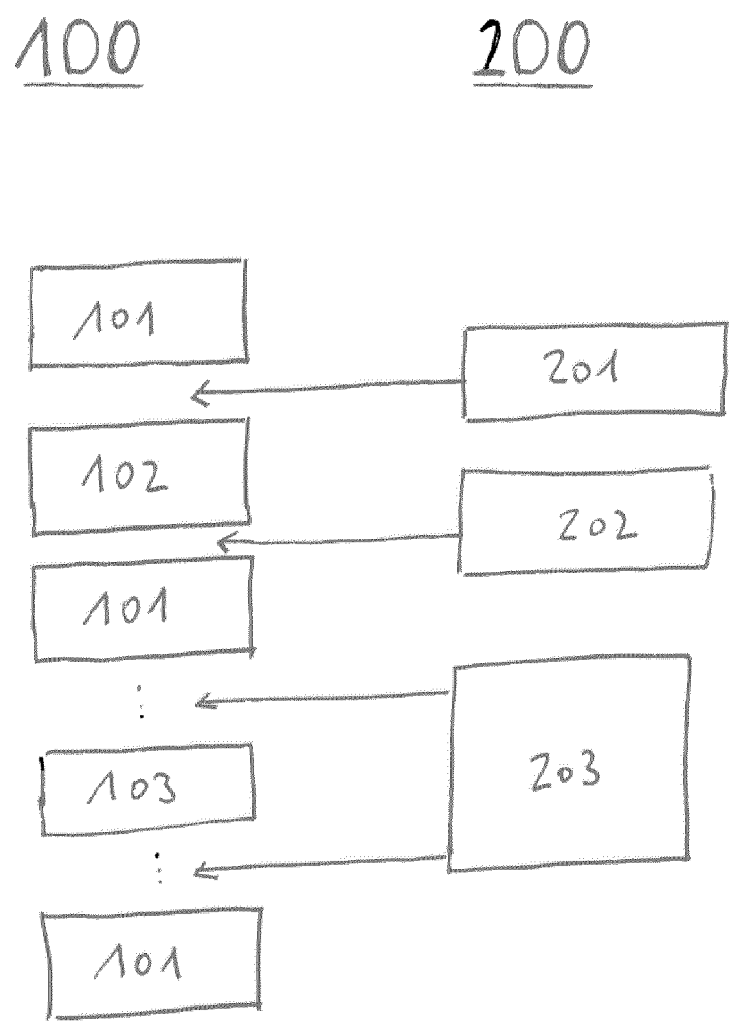

Further details and advantages of the invention result from the following embodiment described with reference to the Figures. There are shown in the Figures:

FIG. 1: a perspective view of a sample container in accordance with the invention;

FIG. 2: a side view of the sample container in accordance with FIG. 1;

FIG. 3: a top view of the sample container in accordance with FIG. 1;

FIG. 4: a sectional view of the sample container in accordance with FIG. 1; and FIG. 5: a schematic representation of a plurality of method steps that can be carried out at a sample container in accordance with the invention.

FIGS. 1 to 4 show an embodiment of a sample container in accordance with the invention that is generally marked by reference numeral 1.

The container 1 has an upwardly open receiving region 2. The receiving region 2 has the form of a right circular cone having straight directrices with an opening angle of 80°, and the lowest point is formed by the cone apex 3.

At its lowest point, the receiving region 2 has an oval outflow opening 4 that can be closed in a reversible liquid-tight manner by the closure surface 5 of the plunger 6. The plunger 6 can be moved in the axis of the cone to reversibly draw the closure surface 5 downwardly from the extent of the surface of the cone and to reversibly release the drain opening 4. It is pneumatically operated.

The closure surface 5 of the plunger 6 follows the contour of the surface of the cone so that the cone surface has no irregularity with a closed outflow opening 4. The outflow opening 4 starts at the cone apex 3 and extends, starting therefrom, only in a direction into the surface of the cone. This produces an asymmetrical design of the outlet opening 4 with respect to the cone and the cone apex 3 is not at the center or within the outlet opening 4, but the edge of outlet opening 4 directly extends through the cone apex 3.

The receiving cone 2 is at the center axis of the sample container 1 while the plunger 6 and the opening 4 are offset with respect to the center axis of the sample container 1. The asymmetrical position of the opening 4 in relation to the cone apex 3 is therefore achieved by an offset of the plunger 6.

A drain space 7 is present at the other side of the drain opening 4 and is connected to a suction line via a connector 14 so that a vacuum can be produced at the drain opening 4 and in the drain space 7.

The receiving region 2 is peripherally surrounded by an annular overflow basin 9 at the open upper side.

A filling and removal station 11 that has a plurality of receivers 12 is furthermore arranged at a web 10 of the sample container that surrounds the overflow basin 9 in an annular manner to hold expulsion nozzles 13 for drop separation that project into or lead to the receiving region 2.

All the fluid-contacting parts are produced from a PTFE/PPVE copolymer. The pneumatic actuator 15 shown in FIG. 4 is produced from PEEK and is supported in a manner secured against rotation in the associated cylinder.

The sample container 1 shown can therefore serve, for example, the receiving of samples that occur after a preparation and scan process in a vapor phase decomposition process (VPD). The samples can be diluted in the receiving cone 2 and supplied to the respective measuring device (an ICP-MS, for example). It can replace the vial racks typically used for such purposes, but remains stationary in the machine and does not have to be replaced, whereby personnel intervention is avoided. The complex and responsible task of external cleaning of the vials and their transport is dispensed with. Further contamination risks are minimized. These goals are achieved by the specific design, by the materials used, by the supply with corresponding media, and by the associated process methods. In accordance with the model of the stationary supply containers, the stationary sample container can be cleaned in the machine after every use and can be effectively dried before the next use. It is furthermore also suitable for very small volumes such as required with VPD samples.

The advantages of the apparatus in accordance with the invention are that the plant does not have to be opened to insert the vials. No contaminants can hereby penetrate into the encapsulated housing. The limits of detection of contaminants, etc. are therefore very low. Due to the system, there is so-to-say an infinite supply of vials available for the analysis. Exactly the same cleaning procedure can always be carried out so that fewer fluctuations have to be accepted in the analysis precision. The apparatus is in particular suitable for long-term tests and remote tests.

The following (part) processes can be used, for example, when using the sample container 1 in accordance with the invention.

Idling Phase:

As regards the first group of processes, the receiving cone 2 is closed and filled with diluted VPD solution (for example diluted hydrofluoric acid) in a standby state (base state or idling phase. An independent process also provides the topping up for compensating evaporation with longer waiting times (e.g. >6 h or with a stopped system). A drying out is thus prevented and a surface conditioning with a VPD matrix is carried out (matrix constancy).

Before a Measurement:

As soon as a sample measurement or blank measures is to take place, the receiving cone 2 is emptied and is not flushed with ultrapure water (UPW) to avoid a matrix change. Residual liquid drops in the region of the outflow opening 4 are sucked off into a space 7 via a vacuum applied across the connector 17. The plunger 6 then again moves upward and presses very small liquid quantities (in the magnitude of 1 µl) over the edge of the opening 4 possibly still present in the gap region between the edges of the opening 4 and the closure surface 5. They are removed in a second and last opening and suction cycle. These processes are assisted by blowing nitrogen into the receiving region 2. The receiving region 2 is now dry and ready for sample reception.

After a Measurement:

After the measurement process, a cleaning and an initial filling take place (after a measurement) with diluted VPD solution for conditioning and to protect the walls of the receiving region 2. The sample container 1 is thus again in the base state. Such a process should generally be carried out after interventions and unknown states to move into the base state. A small amount of concentrated VPD solution (for example, 1% hydrofluoric acid) is injected into the lower region of the receiving cone 2 at the start of this part process to reach a low pH. A precipitation of contamination dissolved in the residue should thus be prevented and a better dissolution of residues of the sample solution should be ensured. A plurality of UPW flushing cycles now take place from above in the drain direction and from below in the overflow direction. Alternating opening and closing periods of the plunger provide a repeated sweeping over of the walls of the receiving region 2 by the phase boundary of the liquid. This increases the effectiveness of the cleaning. Finally, the receiving region 2 is filled up to the overflow 9 and emptied to remove remaining drops adhering to the walls. In the last step, the filling with diluted VPD solution takes place. The dilution is set with time control via the water inflow and thus does not exactly correspond to the measurement matrix. This demand is not necessary at this point and was surrendered in favor of the total process time and while saving expensive matrix components.

Protection Against Drying Out:

A further (part) process can be used with time control to prevent drying out. If a specific time period without carrying out a top-up process is exceeded, this process is started. An exception rule comes into force if the procedure for preparing for a measurement was carried out last and if the receiving region 2 is dry. If no cleaning takes place in a settable time, e.g. 1 h, it is assumed that the system has been stopped. To protect the walls from contamination, a filling of the receiving region 2 is enforced and the sample container 1 is again in the base state (idling phase). It also applies here that the matrix constancy is surrendered in favor of the total process time.

Establishing a Calibration Standard:

To establish a calibration standard, the receiving cone 2 can be topped up with the (exact) measurement matrix after the cleaning procedures such as before a measurement. This is done exactly with respect to concentration.

The process routine can be schematically recognized in FIG. 5.

States of the sample container 1 are generally marked by the reference numeral 100 in the Figure. Reference numeral 101 designates a standby state in which the receiving cone 2 is filled with matrix-consistent diluted VPD solution or sample; reference numeral 102 designates a state with a sample in the receiving region 2; and reference numeral 103 designates an idling state after a plurality of hours without use.

(Part) process in general are marked by reference numeral 200. Reference numeral 201 designates a preparation step in accordance with the above description "Before a measurement". Reference numeral 202 designates a cleaning step in accordance with the above description "After a measurement". Reference numeral 203 designates a routine in accordance with the above description "Protection from drying out".

The invention claimed is:

1. A sample container for receiving small-volume liquid samples, preferably of samples obtained by vapor phase decomposition, wherein
   the container has an upwardly open receiving region,
   the receiving region has an outflow opening at its lowest point that is reversibly closed in a liquid-tight manner by an actuator having a closure surface,
   the receiving region (2) is conical and the lowest point of the receiving region is formed by the cone apex (3),
   the opening (4) is situated at the cone apex (3),
   a plunger (6) has a closure surface (5) located entirely below the opening (4) and arranged to reciprocally cover and uncover the opening (4),
   the receiving region (2) is open at the top thereof and surrounded by an overflow basin (9),
   a web (10) of the container (1) annularly surrounds the overflow basin (9) and contains a filling and removal station (11) having a plurality of receivers (12) holding nozzles (13) for drop separation and projecting into the receiving region (2), and
   means for applying a vacuum to the uncovered opening (4).

2. A sample container in accordance with claim 1, wherein the outflow opening starts at the cone apex and extends, starting from it, only in a direction into the surface of the cone.

3. A sample container in accordance with claim 1, wherein the closure surface of the actuator follows the contour of the receiving region.

4. A sample container in accordance with claim 1, wherein the actuator is a plunger is positioned to move in the axis of the cone to reversibly draw the closure surface from the extent of the surface of the cone and thus to reversibly release the drain opening.

5. A sample container in accordance with claim 1, additionally comprising a drain space (7) situated on a side of the opening (4) opposite the receiving region (2), encompassing the plunger (6) and connected to the vacuum-applying means.

6. A sample container in accordance with claim 1, wherein the conical receiving region (2) is situated along a center axis of the container (1) and both the opening (4) and plunger (6) are offset with respect to the center axis of the container (1).

7. A sample container in accordance with claim 1, wherein the plunger (6) is arranged to downwardly move the closure surface (5) away from the opening (4) to uncover the opening (4).

8. A method for using a sample container in accordance with claim 1, comprising filling the receiving region with a substitution liquid during an idling phase after a removal of a sample and before filling with a new sample.

9. A method for using a sample container in accordance with claim 1, comprising running at least one flushing cycle after removal of a sample in which the receiving region is flushed with flushing liquid, with at least partially filling the receiving region with flushing liquid and closing the outflow opening in each flushing cycle, and then opening the outflow opening to let out the flushing liquid.

10. A method in accordance with claim 9, comprising at least partially filling the receiving region with a cleaning liquid after removing the sample and before running through the flushing cycles with the outflow opening closed, and opening the outflow opening after elapse of a cleaning interval to let out the cleaning liquid.

11. A method for using a sample container in accordance with claim 1, comprising opening the outflow opening to complete outflow of flushing or substitution liquid before filling the receiving region with a sample, and applying a vacuum to the outflow opening during the opening and/or introducing a flushing gas into the receiving region.

* * * * *